United States Patent [19]

Hauser

[11] 3,876,750

[45] Apr. 8, 1975

[54] GAS SCRUBBING SYSTEM

[75] Inventor: Karl V. Hauser, Ann Arbor, Mich.

[73] Assignee: Edw. C. Levy Co., Detroit, Mich.

[22] Filed: Dec. 12, 1972

[21] Appl. No.: 314,466

[52] U.S. Cl. .................... 423/242; 423/166; 210/57
[51] Int. Cl. ....... C01b 17/00; C01f 1/00; C01f 5/40; C01f 11/46
[58] Field of Search ............................ 423/242–244, 423/166, 167, 555; 210/57; 252/181

[56] References Cited
UNITED STATES PATENTS

| | | | |
|---|---|---|---|
| 2,090,142 | 8/1937 | Nonhebel et al. | 423/242 |
| 3,360,399 | 12/1967 | Knox et al. | 423/166 |

FOREIGN PATENTS OR APPLICATIONS

| | | | |
|---|---|---|---|
| 3,644 | 2/1884 | United Kingdom | 252/181 |

*Primary Examiner*—Oscar R. Vertiz
*Assistant Examiner*—Gregory A. Heller
*Attorney, Agent, or Firm*—Harness, Dickey & Pierce

[57] ABSTRACT

The gaseous effluent from power plant boilers, lime kilns or the like is subjected to water scrubbing for the removal of pollutants. The lime kiln gases, or the scrubbing water in the case of boiler gases, is saturated with limestone or other calcium compounds which tend to form scale in the scrubber and other mechanical parts of the purification system. According to the invention, ammonium chloride is added to the water to inhibit the formation of undesirably large scale deposits in the scrubber and related apparatus.

2 Claims, 2 Drawing Figures

GAS SCRUBBING SYSTEM

BACKGROUND OF THE INVENTION

1. Field of the Invention

There are various air polluting industrial processes for which gas scrubber systems have been proposed and are being utilized. One such industrial process consists of a lime kiln in which limestone is converted to quick lime by the passage of hot air and the products of combustion. A substantial amount of limestone dust is entrapped in the air and passes out of the kiln along with the combustion products. Various air pollution control devices have been utilized in connection with lime kilns in order to reduce the amount of limestone dust and combustion products discharged to the atmosphere. One such device consists of a water scrubbing system. It has been found however that limestone particles tend to cling to the inner surfaces of the scrubber and associated equipment and form a scale. Scale buildup can reach such proportions that it can close off the scrubbing water outlet as well as the gas inlet and outlet passages. The removal of such encrusted scale can be a tedious, time-consuming and even dangerous undertaking when done manually.

Other water scrubbing air pollution control systems have been utilized for smoke from the boilers of power generating plants. One of the pollutants which is desirably removed from the gases of such power generating plants is sulfur dioxide ($SO_2$). It has been found that an effective means for removing sulfur dioxide is the addition of a calcium compound such as calcium carbonate (limestone) to the scrubbing water. When the calcium laden water impinges on the exhaust gases in the scrubber a chemical reaction takes place in which calcium sulfite is produced by the reaction of sulfur dioxide with calcium carbonate. This deliberate addition of a calcium compound to the water scrubbing system can have the same undesirable consequence of causing a scale buildup on the interior surfaces of the water scrubbing equipment and its associated apparatus.

2. Description of the Prior Art

The following patents were found as the result of a novelty search but are not believed to teach the present invention.

| | |
|---|---|
| Reinsch et al | 2,808,897 |
| Hvostoff et al | 3,237,381 |
| Hudson | 3,502,441 |
| Kinney | 3,522,000 |
| Schouw | 3,616,604 |
| Buxton, Jr. | 3,431,165 |
| Buxton, Jr. | 3,574,556 |
| Teller, et al | 3,505,788 |
| Calaceto | 3,233,882 |
| Tailor | 3,412,529 |
| Reeve | 3,488,924 |
| Sackett, Sr. | 3,409,409 |
| White | 3,442,232 |
| Diehl | 3,594,980 |

BRIEF SUMMARY OF THE INVENTION

The present invention involves the discovery that the addition of ammonium chloride to the scrubbing water in these processes will prevent the excessive buildup of calcium scale on the interior surfaces of the scrubber and associated equipment. In fact, the addition of ammonium chloride can reverse the scale buildup process when used in a scrubber system already having a substantial scale buildup.

Accordingly, it is an object of the present invention to provide a method of purifying gaseous effluent by the use of scrubbing water, in a manner inhibiting scale formation which would otherwise occur because either the effluent or scrubbing water contain a calcium compound.

Another object is to provide a gas purification system of the above character which is inexpensive to operate, eliminates the need for mechanically removing scale from various surfaces of the purification apparatus, is convenient to maintain and is highly reliable.

Briefly, the illustrated embodiments of the invention each comprises a method for scrubbing gases which includes the steps of passing the gases to be cleaned through a container while subjecting the flowing gases to a water spray which removes impurities therefrom, recirculating at least a portion of the sprayed water, and incorporating a sufficient amount of ammonium chloride in the sprayed water to inhibit the formation of scale in said container which would otherwise be formed by the inclusion of calcium or calcium compounds in the gases being scrubbed or in the sprayed water.

DESCRIPTION OF THE PREFERRED EMBODIMENTS

Figure 1:
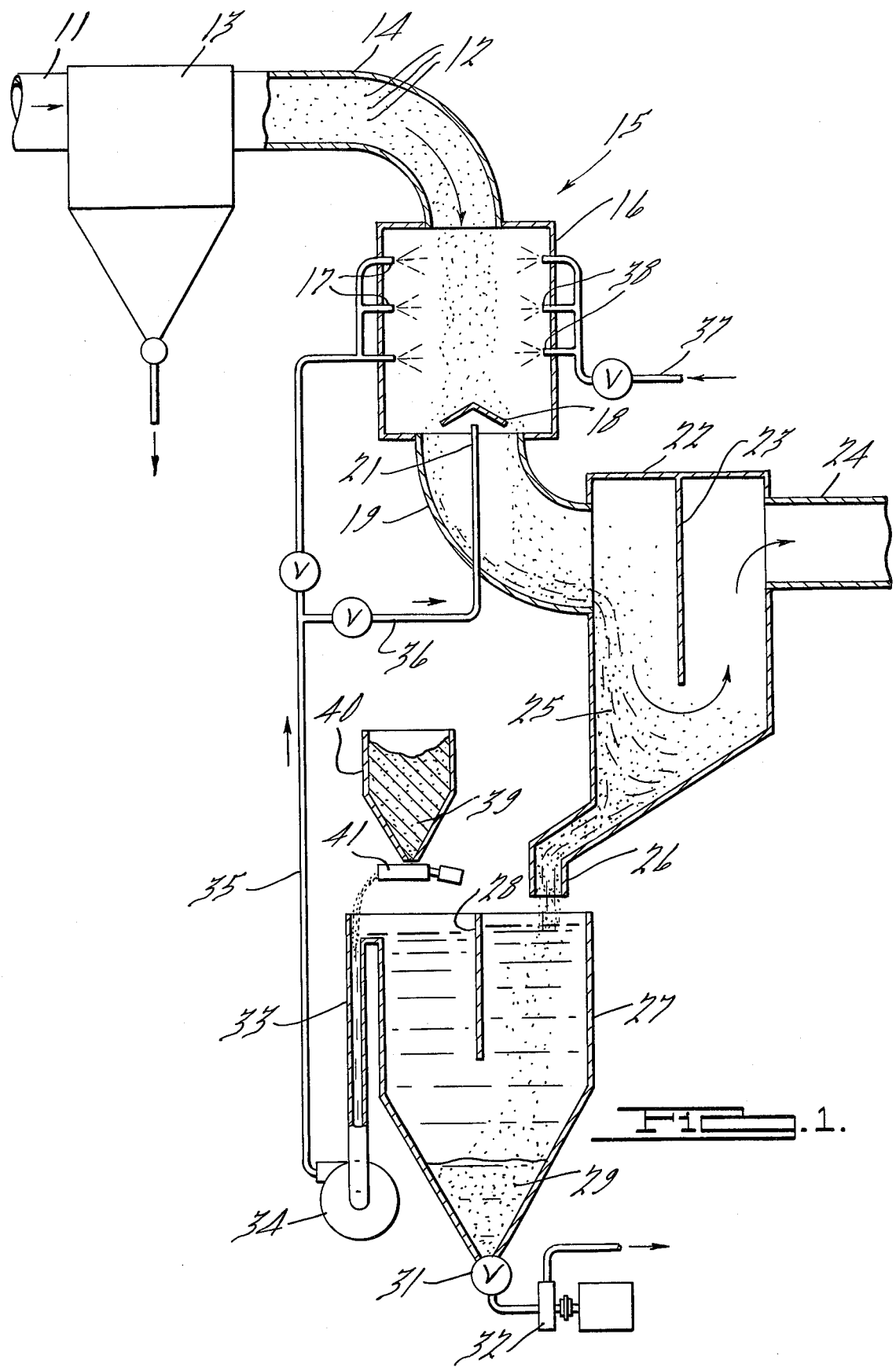
FIG. 1 is a schematic view showing how the invention may be carried out with gases from a lime kiln.

Referring first to the embodiment of FIG. 1, the conduit 11 represents the exit for dust-laden exhaust gases from a unit such as a vertical lime kiln in which limestone is converted to quick lime by the passage of hot air and the products of combustion. Limestone dust indicated at 12 is carried by this air and the process illustrated in FIG. 1 has as a primary object the removal of this dust so that the gases will not pollute the atmosphere. The system for accomplishing this purpose includes a primary dust collector 13 which will entrap some of the dust, this dust exiting below for reuse or disposal. A conduit 14 leads from collector 13 to a scrubber generally indicated at 15 which includes a container 16, the conduit leading into the top of this container. A plurality of nozzles 17 in the sides of container 16 spray water into the flowing gases, removing a major portion of the remaining dust. The gases pass a lower baffle 18 above a conduit 19 leading from the lower end of container 16, a nozzle 21 directing additional scrubbing water at the underside of this baffle which will deflect it outwardly. The gases as well as the dust-laden water flow through conduit 19 into a mist eliminator 22 having a vertical baffle 23 which will tend to separate water particles from the cleaned gases, the latter being drawn by an exhaust fan (not shown) through a conduit 24 to the atmosphere. The dust-laden water 25 will flow downwardly through an exit passage 26 in eliminator 22 to one side of a solids settling chamber 27 having a vertical baffle 28 extending partially therethrough. Sludge 29 will settle in the conical lower portion of chamber 27 to be disposed of through a valve 31 by a sludge pump 32. Relatively clear water will be drawn off from the surface of sludge in chamber 27 remote from exit 26 through a conduit 33 to a recirculating water pump 34. From there it will be returned through conduits 35 and 36 to nozzles 17 and 21.

To compensate for water particles lost in this process, fresh make-up water will be fed by a conduit 37 to nozzles 38 which also pass through the walls of container 16 to aid in the scrubbing action.

Ordinarily, this scrubbing system has caused serious encrustation problems in the lower portion of container 16, the upper surface of baffle 18, and the lower portions of conduit 19 and dust eliminator 22. According to the invention, the scale build-up due to constant passage of limestone dust through these components of the system is alleviated by the addition of a chemical additive 39 which is relatively inexpensive and readily available, namely ammonium chloride ($NH_4Cl$). The ammonium chloride may be added to the water intermittently or continuously at any appropriate point such as at the entrance of conduit 33 by means of a hopper 40 and a feeder 41.

Ammonium chloride dissolved in the water will be sprayed into container 16. It has been found that by this means the buildup of scale is greatly inhibited and in some instances it may actually serve to help remove some scale already formed.

The amount of ammonium chloride added to the water should be varied to suit requirements. In a typical installation, recirculating water was delivered to scrubbing container 16 through nozzles 17 and 21 at a rate of approximately 400 gallons per minute with fresh water being added through nozzle 38 at approximately 100 gallons per minute. It was found that under these circumstances and with the particular installation involved, 150 pounds per day of ammonium chloride added to the water was too low to be effective but 300 pounds per day was quite effective in removal of the accumulated scale. When the system is clean, a smaller quantity may be adequate for maintenance of the condition.

Although the exact nature of the chemical reactions which cause the beneficial result of this invention is not completely known at this time, some clues may be obtained from an analysis of the sludge 29 in the above described example. Sludge removal solids amounted to 12,800 pounds per day and of this the following were quantities by weight:

| | |
|---|---|
| Gypsum | 15% |
| Limestone | 57% |
| Hydrated Lime | 26% |
| Unknown | 2% |

Liquids in the removed sludge amount to 13,600 pounds per day with the following analysis:

| | |
|---|---|
| Calcium Chloride | 1.7% |
| Ammonium Chloride | 0.055% |
| Hydrated Lime | 0.15% |
| Gypsum | 0.22% |
| Water | Balance |

It is evident from these results that most of the ammonia component of the $NH_4Cl$ evaporates and exits with the clean gases since it does not leave with the sludge.

Figure 2:
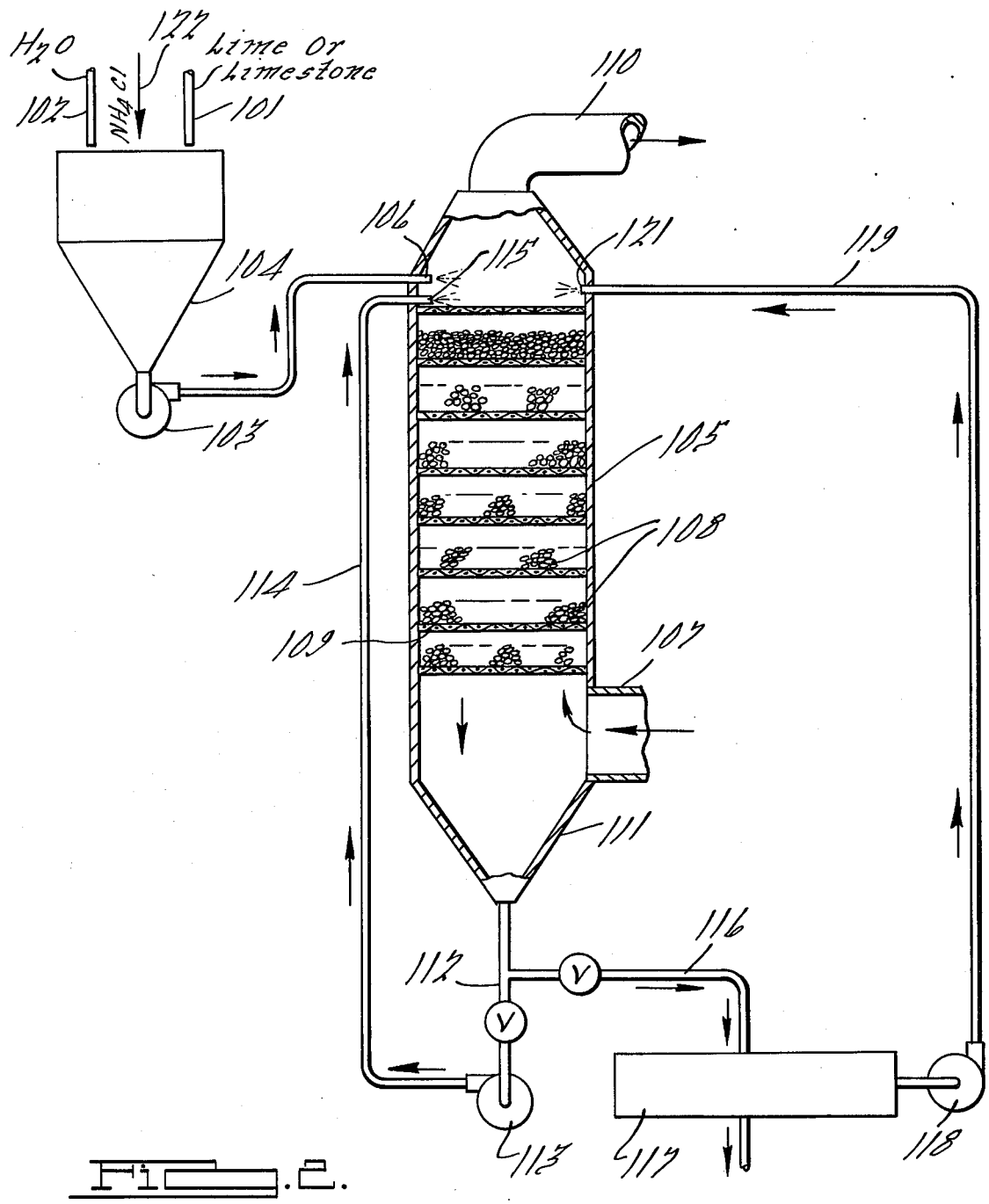
FIG. 2 is a diagrammatic view showing the invention applied to the treatment of boiler exhaust gases.

FIG. 2 illustrates another use of the invention in a system used not to remove particulates but for sulfur dioxide ($SO_2$) removal from the gases of power plant boilers. In this case fine lime or limestone 101 is deliberately added to the scrubbing water 102 in order to absorb sulfur dioxide by chemical reaction, forming calcium sulfite and sulfate, some of the same compounds which cause trouble by scale formation in the previous embodiment. The mixture is delivered by a pump 103 from a slurry tank 104 to a scrubbing container 105 through one or more nozzles 106. This scrubbing container is vertically disposed, having a gas entrance at its lower end to which boiler exhaust gases are delivered through a conduit 107. The gases flow upwardly through container 105 which has ceramic or other contact media 108 on trays 109 distributed therethrough. The slurry sprayed into container 105 and falling downwardly through this media will remove the sulfur dioxide from the upwardly flowing gases which will exit through a conduit 110 at the upper end of the container. The slurry will pass downwardly to the lower end 111 of the container, being delivered through a conduit 112 to a recirculating pump 113. The pump will pass it upwardly through a conduit 114 to nozzles 115 in the upper portion of scrubbing container 105. A fractional part of the stream will be drawn off from conduit 112 through a conduit 116 to a settling pond or filter 117, the sludge disposal taking place from this unit. Clear supernatant liquor from unit 117 will be delivered by a pump 118 through a conduit 119 to one or more nozzles 121 in the upper portion of scrubber container 105.

The problems existing with respect to such limestone scrubbing systems for the removal of $SO_2$ from power plant exhausts is similar to that described above with respect to FIG. 1. Formerly, scaling had been so serious a problem that the use of lime or limestone in the slurry appeared unfeasible unless the scubber liquor was diluted with water or extremely high recirculation rates were used. If the liquor was diluted with water, the system was not "closed loop" — that is, liquor must be overflowed to a water course. However, such open loop operations, while they may avoid or minimize the scaling problem, substitute water pollution for atmospheric pollution. A high recirculation rate is unsatisfactory where relatively high sulfur dioxide contents exist, since this then becomes a very expensive procedure.

According to the invention, these problems are overcome by the addition of ammonium chloride ($NH_4Cl$) to the slurry. This may be done at any convenient place in the process such as at the entrance to the slurry tank 104 as indicated by the arrow 122. Alternatively, the ammonium chloride could be added in one of the return streams 114 or 119 instead of with the fresh slurry.

I claim:

1. A method for cleaning exhaust gases exiting from a lime kiln, which comprises the steps of passing said exhaust gases through a scrubber container, spraying the gases in said container with water, removing the sprayed gases from the scrubber container, draining the sprayed water from the scrubber container into a solids settling chamber, recirculating water from said settling chamber to said scrubber container, adding fresh make-up water, and adding ammonium chloride to the water sprayed into said container in sufficient quantities to inhibit scale formation therein.

2. A method for removing sulfur dioxide from boiler exhaust gases, which comprises the steps of passing the gases through a scrubber container, spraying said gases with a slurry comprising water and lime or limestone, removing the cleaned scrubbed gases from said container, draining the slurry from said container, recirculating the slurry through spray means to said container, draining a fractional portion of the slurry stream to means for separating sludge therefrom, recirculating a supernatant liquor from said sludge separating means to spray means in said scrubber container, and adding ammonium chloride to the slurry or liquor sprayed into said container in sufficient quantities to inhibit scale formation therein.

* * * * *